United States Patent Office 3,356,455
Patented Dec. 5, 1967

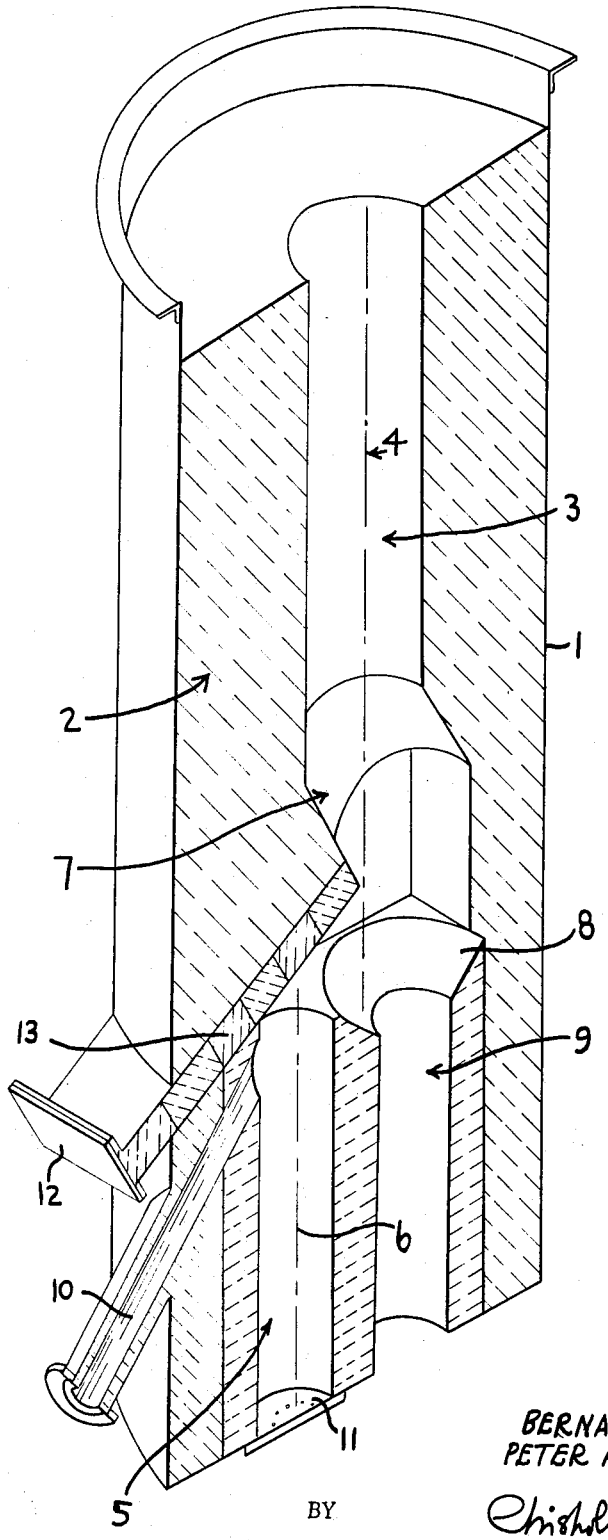

3,356,455
PROCESS FOR PRODUCING PIGMENTARY METAL OXIDES SUBSTANTIALLY FREE FROM FALLING ACCRETION MATERIAL
Bernard Harris, Middlesbrough, and Peter Alan Jones, Stockton-on-Tees, England, assignors to British Titan Products Company Limited, Billingham, England, a corporation of the United Kingdom
Filed Mar. 1, 1965, Ser. No. 440,956
6 Claims. (Cl. 23—202)

ABSTRACT OF THE DISCLOSURE

In the oxidation of vaporous metal halides by reaction of the vaporous metal halides with an oxidizing gas, it is common to effect the process in two stages or steps with the second step or stage of the process conducted vertically above the first zone in which the first step or stage is conducted such that rising gases including suspended metal oxide particles can be carried into the upper zone. It has been found that undesirable accretion products forming in the upper zone tend to loosen from the walls of the reactor and fall into the lower zone with a cooling and/or other interference with the reaction proceeding in the lower zone. This problem can be obviated by laterally offsetting the lower zone relative to the upper zone and providing a second lower zone which serves as a receiver for accretion products falling from the upper zone. The lower reaction zone, however, communicates with the upper reaction zone without danger of accretion products falling therein. Both process and apparatus are described for overcoming the problem discussed above.

The present invention relates to a process and apparatus suitable for the vapour phase oxidation of metal halides to produce finely divided solid metal oxides. In this specification the term "metal" includes elements having metal-like properties; it specifically includes metalloids, particularly silicon.

Processes for the production of finely divided metal oxides by the vapour phase oxidation of a metal halide, for example the production of titanium dioxide, zirconium dioxide or silicon dioxide from the corresponding halides, are well known and have been described, for example, in British patent specifications 761,770, 919,018 and 661,685. The oxidation reaction may take place in a hot fluidised bed of particles or in a substantially empty chamber into which the halide and oxidising gas are introduced, the bed or empty chamber being maintained at a suitable reaction temperature.

A recently discovered process of this type is described and claimed in our British patent specification 254,007. This process comprises passing into a reaction zone a stream of hot gas containing initial solid particles of smaller average particle size than that of the metal oxide to be produced; introducing into the reaction zone a metal halide and an oxygenating gas, at least one of these reactants being introduced through a plurality of inlets spaced along the length of the zone in the direction of the gas flow; the temperature of the gas stream in the reaction zone being such that the halide and oxygenating gas will react to form metal oxide, and thereafter recovering finely divided metal oxide from the reaction zone. The initial solid particles may be small preformed particles of the same metal oxide as that produced by the process, and they may themselves be formed by the vapour phase oxidation of metal halide. The effluent gases from such oxidation may constitute the hot gas stream passed into the reaction zone. In a preferred embodiment, the initial solid particles are formed by the vapour phase oxidation of a metal halide in a fluidised bed contained in the lower part of a shaft chamber, and the effluent gases from the bed, carrying the initial solid particles in suspension, pass into the upper part of the shaft chamber which contains the above-mentioned reaction zone. A preferred method of introducing the metal halide which is to be oxidised in the reaction zone in the presence of the initial solid particles is through the combined injector/scraper device described and claimed in our U.S. application Ser. No. 417,130.

In all such processes for the production of finely divided metal oxides there is a possibility of an accretion of the oxide forming in the reaction zone, upon the walls of the reactor and any surfaces therein, for example, where a combined injector/scraper is used, upon the surface of this device. The accumulated accretion may, from time to time, fall to the bottom of the reactor. If there is a fluidised bed in the bottom of the reactor (as in a preferred embodiment of our specification 254,007 mentioned above) the accretion material falling from the walls and other structures will fall into the bed and since it may be composed of larger particles than those forming the fluidised bed, it may interfere with and eve stop the fluidisation of the bed.

The material falling into the fluidised bed is generally cooler than the bed, and this causes sudden variations in the temperature of parts of the bed; this is particularly noticeable if the accreted material falls in the form of large pieces. The fallen material tends to sinter in the bed to form large masses which may impede fluidisation of the bed; such masses may also block any outlet pipe intended for the removal of bed particles which may have become oversized by reason of accretion of metal oxide thereon. All these factors tend to reduce the quality of the metal oxide produced by the process. Such reduction in quality is, of course, undesirable, particularly when the metal oxide is desired in a state of high quality, for example when such oxide is titanium dioxide intended for pigmentary use.

Even where there is no fluidised bed present, the fall of the accretion material may still diminish severely the efficiency of the process. Thus, such material may fall into and/or around the orifices through which the reactants are introduced into the reactor, particularly if these are in the base of the reactor, causing interruption of the flow of reactants and/or determination in the quality of the metal oxide produced.

It is an object of the present invention to provide a process and apparatus for the production of finely divided metal oxides which enables such difficulties to be reduced or eliminated.

Accordingly, the invention provides a process for the production of finely divided metal oxides comprising oxidising a metal halide vapour in a lower zone to form a hot gas stream containing particles of metal oxide, substantially immediately passing the hot gas stream into an upper zone which is so positioned that at least the greater part and preferably substantially all of any solid particles falling from this zone do not fall into the lower zone, and thereafter recovering metal oxide from the upper zone.

The present invention also provides a reactor suitable for use in the vapour phase oxidation of a metal halide to the corresponding oxide, the reactor comprising a lower zone and an upper zone in open communication with each other, the lower zone being provided with an orifice or orifices for the introduction of reactants and the upper zone with an orifice or orifices for the introduction of reactants and the upper zone with an orifice or orifices for the withdrawal of reaction products, and the apparatus being so arranged that at least the greater part, preferably substantially all, of any solid particles falling from the upper zone do not fall into the lower zone.

Preferably the lower end of the upper zone is laterally offset from the upper end of the lower reaction zone, in the case of these zones being vertical, e.g., in the form of shaft chambers. However, it is quite possible in accordance with this invention to use (if desired) a reactor in which the upper zone is situated substantially vertically above the lower zone but in which the lower end only of the upper zone is laterally offset from the upper end of the lower zone.

The invention is particularly useful when further oxidation is to be effected in the upper zone. The metal halide oxidised there may be the same as, or different from, that oxidised in the lower zone.

The process of the present invention may be applied to any metal halide which can be oxidised in the vapour phase to a finely divided oxide. Thus, it may be applied to the tetrahalide of titanium, zirconium or silicon or the trihalide of aluminium. Another halide envisaged is ferric chloride which yields ferric oxide on oxidation. The invention is, however, of particular value in the production of pigmentary titanium dioxide by the oxidation in the vapour phase of a titanum tetrahalide and the invention will generally be described with reference to such a process. The halides referred to in this specification are the chlorides (which are usually preferred), the iodides and the bromides. The fluorides are unsuitable for the process of the present invention and are excluded.

The oxidation may be effected by means of an oxidising gas, which may be any suitable gas containing free or combined oxygen, e.g., oxygen itself, air, or an oxide of nitrogen.

The preferred titanium tetrahalide is titanium tetrachloride, and the preferred oxidising gas is oxygen or an oxygen-containing mixture of gases such as air. If desired the oxidation of the titanium tetrachloride may be carried out in the presence of small amounts of other halides such as aluminium trichloride, silicon tetrachloride, and/or a lower chloride of titanium (e.g., titanium trichloride). Such additives may be used, for example, in order to modify the properties of the pigmentary titanium dioxide produced.

In one embodiment of the invention the lower zone contains a hot bed of particles fluidised by passage of the metal halide vapour and oxidising (with or without the assistance of an inert gas) and the hot gas stream containing metal oxide particles formed by the reaction is then passed into the upper zone. The invention may be particularly useful in such an embodiment since falls of metal oxide which have accumulated in the upper zone do not enter the fluidised bed but may be directed away as described later.

The reaction in the fluidised bed in the lower zone may, if desired, be carried out in such a manner that the particles of metal oxide produced particularly in the case of titanium dioxide are of smaller weight median particle size than that generally considered to be the optimum pigmentary size, for example below a weight median particle size of about 0.25 micron particularly below about 0.20 micron.

One method by which such particles can be obtained is the addition of a minor proportion of a source of the element potassium, rubidium or caesium, particularly the first, to the fluidised bed. The addition of such materials may also be of use in reducing the amount of titanium dioxide retained in the bed as an accretion on the bed particles. Other methods for obtaining particularly small particles from the first zone include that described in our Belgian Patent 672,781 and that of vapour phase hydrolysis of titanium tetrahalide in the lower zone.

The hot gas stream containing the particles of titanium dioxide produced in the lower zone may then be passed into the upper zone which may be maintained at a temperature of at least 600° C., and preferably at least 800° C., if there is to be oxidised more titanium tetrahalide in the upper zone, for example as described in our British patent specification 254,007. Such a process may give pigmentary titanium dioxide of excellent tinting strength and uniform particle size.

Where titanium tetrahalide is oxidised in the upper zone, it is preferably introduced, together with the oxidising gas, by means of the combined injector/scraper device of U.S. patent application Serial No. 417,130, filed December 9, 1964. When such a device is used titanium dioxide is continuously being dislodged from the walls of the upper zone and from the surface of the injector/scraper itself and the present invention is of particular value under such circumstances in preventing the dislodged material from entering the lower zone.

The formation of the particles in the lower zone may be effected in the absence of a fluidised bed. To provide heat for the reaction, an electric arc or induction heating may be used to heat a reactant or an inert gas to a high temperature, such gas then being introduced into the lower zone to provide heat for the oxidation therein of titanium tetrahalide to titanium dioxide. Such a process is described and claimed in our British patent specification 256,386. Alternatively, the necessary heat may be provided by burning a fuel in the lower zone, making use of an excess of the oxidising gas, or by externally heating the zone.

If additional amounts of metal halide are to be oxidised in the upper zone, it is not essential to the present invention that all or even part of such additional amounts be introduced in the upper zone since the reaction in the upper zone may be the reaction between unreacted metal halide and oxidising gas emerging from the lower zone. It is also not essential to provide a scraper in the upper zone since the accretions of oxide may fall off the walls unaided.

In a preferred embodiment of the present invention, the lateral distance between the centre of the outlet from the lower zone and the centre of the inlet into the upper zone is at least one-half the diameter, and preferably at least three-quarters the diameter, of the lower zone and the lower end of the upper zone is also so shaped as to direct particles falling from the upper zone away from the lower zone, for example, as shown in the accompanying drawing.

Beneath the lower end of the upper zone provision may suitably be made for a shaft, conveniently with a chamfered upper edge, to receive the particles which fall from the upper zone. Such a shaft is suitably provided with means at the bottom for removing accumulated deposit from time to time, for example, a trap door, hatch, valved conduit or the like.

It is preferred, particularly when further quantities of halide are to be oxidised in the upper zone, that the lower zone should be as short as possible consistent with adequate reaction taking place to ensure that the hot gas stream containing oxide particles passes into the upper zone as quickly as possible and consistent with the lower zone having sufficient height to prevent excessive heating of the reactor wall immediately above this zone.

It is desirable to make provision for renewing the surface of the reactor upon which the reaction products from the lower zone impinge before passing to the upper reaction zone without the necessity for dismantling the reactor. One example of such means is shown in the accompanying drawing.

Where a fluidised bed is used in the lower zone and where oxide accretion on the bed particles during the reaction is significant, provision is normally made in the walls of this zone for the overflow of the bed particles during the reaction and for the supply of fresh smaller particles to the bed in order to maintain particles of a fluidiseable size in the bed.

The attached drawing shows one embodiment of the apparatus of the present invention.

The drawing is a sectional view of a reactor wherein provision is made for a fluidised bed in the lower zone.

The reactor comprises an outer steel shell 1 lined with refractory concrete 2, inside which is an upper zone 3 surmounted by a cover (not shown) through which may be inserted a scraper or a combined injector/scraper (as described, for example, in U.S. application Ser. No. 417,130). The vertical axis of the upper zone is indicated by the dotted line 4. The reactor also comprises a lower zone 5. The vertical axis of the lower zone 5 is indicated by the dotted line 6. The lower zone 5 is laterally offset from the upper zone 3. The upper zone 3 is provided with an angled lower portion 7 which is directed towards the chamfered upper end 8 of a shaft 9 to receive accreted material falling from the upper zone 3. The lower end of the shaft is provided with a removable cover (not shown) through which particles can be removed from the shaft, as desired.

The lower zone 5 is provided with an overflow pipe 10 from the upper level of the fluidised bed (not shown) and means (not shown) to supply bed particles to the bed. Reactants are introduced into the bed through the base 11 of the lower reaction zone 5 through inlets (not shown).

The reactor is so constructed that hatch 12 can be removed and bricks of refractory material 13 inserted to replace bricks adjacent the top of the lower zone 5 which may have been damaged during operation of the process.

A reactor of the type described above was constructed. The lower zone 5 was 13″ in diameter and 4′6″ in height, and the upper zone 3 was 19″ in diameter and 6′4½″ in height. The vertical axis of the lower zone 5 was laterally offset from that of the upper zone 3 a distance of 9½″.

A shaft 9 of the same dimensions as the lower zone 5 was provided beside the latter and at a distance of 6″ from it, and the lower end of the upper zone 3 was formed at an angle of 30° from the vertical so that the lower axis from this zone was immediately above the shaft opening. The reactor wall above the lower zone 5 was set at an angle of 30° above the horizontal and led to the lower end of the upper zone 3.

The following example illustrates the process of the present invention.

*Example*

Sufficient titanium dioxide particles of diameter about 320 microns were placed in the lower zone 5 to form a bed which was 32″ deep when static. Titanium tetrachloride was introduced into the lower zone 5 through three central inlets in the base 11 at a rate of 5 lb./min. Oxygen was simultaneously introduced through six inlets disposed around the three central inlets in the base plate at a rate of 22.5 cu. ft./hr.; the oxygen contained 10 lb./hr. of aluminum trichloride and also contained a small amount of propane (about 4 lb./hr.). The introduction of these gases fluidised the bed. The temperature of the bed was maintained at 1150° C.

The combined injector/scraper similar to that described in U.S. application Ser. No. 417,130 was provided in the upper zone. The scraper/injector carried four inlet orifices in each of its two limbs. Each inlet orifice was 10″ from the next, and the two lowest inlet orifices were 42″ above the top of the fluidised bed. A preheated mixture was introduced through the scraper/injector. This mixture contained 7.5 lb./min. of titanium tetrachloride, 22.5 cu. ft./min. of oxygen and sufficient silicon tetrachloride to produce 0.5% of silica by weight of the titanium dioxide produced from the 7.5 lb./min. of titanium tetrachloride introduced through the scraper/injector.

During the process, a good rutile pigment was obtained suspended in the gases leaving the upper zone. This rutile pigment had a tinting strength of about 1750 on the Reynolds scale.

Meanwhile, a growth of coarse titanium dioxide particles was formed on the walls of the upper zone. These particles were detached from the walls of the upper zone and from the surface of the scraper/injector and fell into shaft 9 from which they were removed every hour through a water-cooled cock in the base of the shaft.

What is claimed is:
1. In a two-stage process for the production of finely divided metal oxides wherein vaporized metal halide is oxidized to corresponding metal oxide particles in a vertically rising gas stream of oxidizing gas and said metal oxide particles in said rising gas stream are passed to a second reaction zone for the reaction of additional metal halide and oxidizing gas in the presence of said metal oxide particles, the improvement which comprises (a) positioning said first and second reaction zones in lower and upper relationship with their vertical axes laterally offset, (b) providing an accretion collection zone adjacent said first reaction zone vertically beneath said second reaction zone, (c) effecting said first oxidation step in said first reaction zone, (d) passing the metal oxide reaction product of said first reaction zone into said second reaction zone, (e) effecting said second oxidation step in said second reaction zone, (f) withdrawing from said second reaction zone the desired final product, and (g) withdrawing from said accretion collection zone loosened accretion products formed therein which have fallen through said second reaction zone into said collection zone whereby said first oxidation step in said first reaction zone proceeds substantially unimpeded by accretion product from said second reaction zone.

2. The process of claim 1 wherein the metal oxide nuclei formed in the lower zone have a weight median particle size less than about 0.25 micron.

3. The process of claim 2 in which the weight median particle size is less than about 0.20 micron.

4. The process of claim 2 wherein the lower zone contains a fluidised bed at elevated temperature in which the metal halide and the oxygenating gas react.

5. The process of claim 4 wherein the metal halide is selected from the group consisting of titanium tetrahalide, zirconium tetrahalide, silicon tetrahalide and aluminium tetrahalide.

6. The process of claim 4 in which the metal halide is titanium tetrachloride.

References Cited

UNITED STATES PATENTS

| | | | |
|---|---|---|---|
| 2,805,921 | 9/1957 | Schaumann | 23—202 |
| 3,022,137 | 2/1962 | Nelson | 23—202 |
| 3,043,657 | 7/1962 | Hughes et al. | 23—202 X |
| 3,147,077 | 9/1964 | Callow et al. | 23—202 |

MILTON WEISSMAN, *Primary Examiner.*

EDWARD STERN, *Examiner.*